United States Patent [19]

Fischer et al.

[11] 4,126,414

[45] Nov. 21, 1978

[54] COPOLYAMIDE AND ITS USE FOR FINISHING LEATHER AND LEATHER SUBSTITUTES

[75] Inventors: Karl Fischer, Bad Durkheim; Peter Horn, Hirschberg; Guenter Eckert, Limburgerhof; Franz Leppmeier, Ludwigshafen, all of Fed. Rep. of Germany

[73] Assignee: BASF Aktiengesellschaft, Ludwigshafen am Rhein, Fed. Rep. of Germany

[21] Appl. No.: 796,547

[22] Filed: May 13, 1977

[30] Foreign Application Priority Data

Jun. 16, 1976 [DE] Fed. Rep. of Germany ....... 2626931

[51] Int. Cl.$^2$ ............................................. C14C 11/00
[52] U.S. Cl. ................................... 8/94.21; 8/94.1 R; 260/857 TW
[58] Field of Search ............................ 8/94.1 R, 94.21

[56] References Cited

U.S. PATENT DOCUMENTS

| 2,280,830 | 4/1942 | Johnson | 8/94.21 |
| 3,441,365 | 4/1969 | Lowell et al. | 8/94.21 |

FOREIGN PATENT DOCUMENTS

941,997  11/1963  United Kingdom ..................... 8/94.21

*Primary Examiner*—John Kight, III
*Attorney, Agent, or Firm*—Keil, Thompson & Shurtleff

[57] ABSTRACT

A specific copolyamide and its use for finishing leather and leather substitutes, particularly those of polyurethane. A particular advantage of the copolyamide is its sealing effect counteracting the migration of dyes, plasticizers and fats, combined with other advantages such as good mechanical properties and the stability of the solutions.

3 Claims, No Drawings

COPOLYAMIDE AND ITS USE FOR FINISHING LEATHER AND LEATHER SUBSTITUTES

This invention relates to a novel copolyamide and a process for finishing leather and leather substitutes by coating the substrate with a solution of said copolyamide and drying. The special composition of the copolyamide produces a combination of desired properties such as has not hitherto been achieved by any finish.

Finishing is carried out to impart a particular appearance and certain sensory and fastness properties to leather or leather substitutes (synthetic leather). The finishing operation is the final processing step. The finish affects the color, gloss and handle of the material and its resistance to external influences. It must adhere well to the substrate, be resistant to crocking in both the wet and dry states and have a high flexing endurance.

In the case of leather substitutes containing plasticizers and dyes, the finish should prevent migration of plasticizers and dyes or organic pigments possessing a certain degree of solubility to the surface of the material, and thus prevent tackiness and bleeding of the dye.

Migration is particularly undesirable at the interface between two differently colored substrates (leather/leather, leather/leather substitute or leather substitute/leather substitute), particularly when at least one of them contains plasticizers or fats, since in such cases the dyes are transferred to the differently dyed or undyed material. Such interfaces are becoming more frequent in the present-day combined use of natural and synthetic leathers, particularly in the shoe industry and also in the manufacture of bags and the like.

A further requirement is that the solutions in which the finish is marketed should be stable on storage, i.e. they should not show a tendency to gel.

The above requirements are not all satisfied by any one conventional finish. Most of the prior art finishes, e.g. finishes based on nitrocellulose, cellulose acetobutyrate (CAB), polyurethane and vinyl chloride polymers, provide no or an inadequate barrier against the migration of dyes and plasticizers. Furthermore, their handle is similar to that of plastics materials. Others, for example those based on proteins such as casein, have a better handle but also do not produce a satisfactory barrier and are only moderately resistant to wet crocking and inadequately so in the case of some leathers. Furthermore, they require an additional fixing step. Neither is the problem solved by the use of acrylate or methacrylate polymers. Although rigid grades (e.g. poly(methyl methacrylate)) will stop migration, they are useless due to their mechanical properties, particularly their flexing endurance, as they are much too hard and rigid. When using soft grades (methacrylates of higher alcohols or copolymers of acrylates), the antimigration effect diminishes rapidly.

The polyamide coatings hitherto used as finishes either form stable solutions or coatings thereof form a good migration barrier. They cannot satisfy both requirements at the same time. The first group mainly comprises polyamides based on dimerized fatty acids such as are described in U.S. Pat. Nos. 2,450,940 and 2,840,264. The second group, which has a good antimigration effect but provides unstable solutions, essentially comprises the conventional copolyamides containing polymerized units of cycloaliphatic diamines. Solutions thereof tend to gel during storage.

Copolyamides formed by simple combination, for example copolyamides of approximately equal portions of caprolactam and the salt of adipic acid and hexamethylene diamine, produce neither stable solutions nor coatings having the property of inhibiting or preventing migration.

In addition to at least one of the above drawbacks, most of the polyamide coatings on the market show poor water resistance and produce a hard surface after drying. Furthermore, difficulties often occur as regards elasticity and adhesion on flexible substrates.

It is an object of the invention to provide a finish which satisfies all of the above requirements at the same time, i.e., forms stable solutions with conventional solvent mixtures, shows firm and permanent adhesion to the substrate, has good sensory and physical properties and prevents the migration of plasticizers and dyes. Another object of the invention is to provide a method of finishing leather using said copolyamides.

We have found that these objects are achieved by copolyamides comprising units of (a) from 10 to 32% and preferably from 18 to 30% and more preferably from 18 to 25%, by weight, of the salt of adipic acid and hexamethylenediamine, (b) from 30 to 45% and preferably from 35 to 42% and more preferably from 38 to 42%, by weight, of caprolactam and (c) from 28 to 45% and preferably from 35 to 42% and more preferably from 38 to 42%, by weight, of the salt of adipic acid and bis-(4-amino-cyclohexyl)-2,2-propane which copolyamides have K values of from 35 to 70 and preferably from 40 to 65, as measured according to the method proposed by H. Fikentscher in Cellulosechemie 13 (1932), pp. 58 to 64 and 71 to 74, on a 1% solution in 96% sulfuric acid at 20° C., and by a process for finishing leather and leather substitutes using solutions of said copolyamides in a conventional solvent mixture.

The finish of the invention is the first to satisfy all of the aforementioned requirements at the same time. Small deviations, either as regards the type of ingredients used or as regards their proportions, lead to serious deficiencies with respect to one or other of the said properties, so that the balanced combination of properties forming the basis of the invention is lost.

The copolyamides are prepared in conventional manner by melt polycondensation of the ingredients at from 180° to 300° and preferably from 200° to 280° C., in the presence or absence of traces of a monofunctional carboxylic acid such as stearic acid or propionic acid acting as chain stopper, and with the removal of the water of reaction.

Solvents in which the copolyamides provided by the invention may be used are any of those normally used for copolyamides, i.e. mixtures of those organic polar solvents which form at least 10 to 20% w/w stable solutions with the copolyamides, do not react with the polyamides or the substrate under the conditions of storage and application, and boil at a sufficiently low temperature to ensure rapid drying. Advantageously, the solvents used should not boil at a temperature lower than 60° C. and not above 150° C. Suitable ingredients are, for example, aromatics such as benzene, toluene, xylenes, preferably toluene, and alcohols such as methanol, ethanol, n-propanol and isopropanol and the isomeric butanols and pentanols, and also isomerized octanols such as 2-ethylhexanol, and cycloalkanols such as cyclopentanol and cyclohexanol, and also glycols such as ethylene glycol, and ether alcohols such as ethyl glycol (ethylene glycol monoethyl ether) and ketones such as methyl ethyl ketone and cyclohexanone. We prefer to use ternary mixtures, e.g. mixtures of n-alkanols of the above definition, cycloalkanols and aromatics, particularly a mixture of ethanol, cyclohexanol and toluene. Aromatic hydrocarbons in combination with glycol ethers and/or glycol esters and/or glycol ether esters and ketones and aliphatic and/or cycloaliphatic alcohols are even more preferable. Other very suitable mixtures contain toluene, methanol, ethanol, ethyl glycol, methyl ethyl ketone and cyclohexanone. Depending on the intended method of application (e.g. spraying or printing) and the rate of application, use will be made of low-boiling or (to prevent drying on the printing roller) somewhat higher-boiling mixtures.

The copolyamides are marketed in 5 to 25% and preferably 10 to 20% w/w solutions. These solutions show excellent shelf-storage properties, i.e. they show no tendency to gel at normal or relatively low temperatures and over long periods of storage, but retain their viscosity unchanged and form no precipitates. Prior to use, they are generally diluted with the same or some other conventional solvents to from 2 to 6 times their volume, depending on the use to which they are to be put.

The solvents may be colored by the addition of conventional inorganic or organic pigment formulations or conventional soluble dyes. Suitable pigment formulations are only those of which the binder is soluble in the polyamide solutions and is compatible with the dissolved copolyamides, i.e. forms no precipitates therewith. For example, suitable pigment formulations are those based on vinyl chloride/vinyl acetate copolymers or, preferably, nitrocellulose. Examples of suitable organic dyes are 1:1 or 1:2 complexes of azo dyes.

When used on leather having elastic properties and particularly when such leather is to be milled after application of the finish, the use of a plasticizer is recommended in order to avoid the formation of fine cracks in the finish. Suitable plasticizers are those usually employed for polyamides, for example benzenesulfonic acid n-butylamide, benzenesulfonic acid (2-ethylhexyl)-amide, and (2-ethylhexyl)-p-benzoate. The plasticizers are used at a rate of from 5 to 40 and preferably from 10 to 30 and more preferably from 10 to 20%, by weight of the copolyamide. The antimigrating properties of the finishes are not appreciably impaired by such additions.

Other conventional substances such as delustrants and nitrocellulose solutions may, of course, be added to the copolyamide solutions. The addition of agents to improve the handle is not generally necessary in view of the excellent sensory properties of the finishes of the invention.

Preferred leather substitutes are those based on polyurethane, although synthetic leathers based on polyacrylate or polyamide are also suitable. The finishes of the invention are mainly used on natural leathers.

Application of the solutions for finishing leather or leather substitutes is carried out in conventional manner, for example by doctoring, pouring, but preferably by spraying, particularly with a spraygun, or printing with, say, engraved rollers. Application is normally at the rate of from 3 to 25 and preferably from 6 to 15 g of copolyamide per $m^2$ of substrate. The finish is then dried in conventional manner. It is usually sufficient to pass the material through a drying tunnel for from 1 to 2 minutes at 70° to 80° C., although it may be hung up to dry at room temperature, if desired.

Finishes produced in this manner have a pleasantly soft leather-like handle, and finished natural leather may be subjected to mechanical stress without the finish peeling or rubbing off, i.e. the finish is fast to wet and dry crocking, it is fast to buckling under wet and dry conditions, adheres permanently to leather substitutes, particularly those based on polyurethane, and effectively prevents migration of plasticizers or fats as well as dyes and organic pigments to the surface, i.e. it prevents the surface from becoming tacky and also, in particular, prevents bleeding of the dyes or pigments at the interfaces between two differently dyed substrates. Finally, the copolyamides of the invention and the finishes produced therefrom show very good lightfastness, may be high frequency welded and are resistant to free amines (which are contained in polyurethane foams as catalysts and which gradually diffuse therefrom to attack conventional finishes such as those based on nitrocellulose in the coating material concerned). If necessary, for example when coating of the leather surface is to be reduced to a minimum, the copolyamide of the invention may be the only material applied to the dried leather without effecting finishing in the conventional manner by applying a number of differently composed layers (bottom coat, top coat).

In the following Examples the parts and percentages are by weight.

EXAMPLE 1

Composition of copolyamide:
20% of salt of adipic acid and hexamethylene diamine
40% of caprolactam
40% of salt of adipic acid and bis(-4-aminocyclohexyl)-2,2-propane.
The K value is 64.

150 parts of this copolyamide and 20 parts of (2-ethylhexyl)-p-benzoate are dissolved in a mixture of 150 parts of methanol, 300 parts of ethanol and 400 parts of toluene. 100 parts of this solution are stirred with 20 parts of a commercial collodion finish and the mixture is diluted with 3 times its volume of a diluent mixture consisting of 20% of methanol, 24% of ethanol, 22% of toluene, 13% of ethylglycol, 15% of methylethylketone and 6% of cyclohexanone. The resulting solution is sprayed onto conventionally top coated full grain nappa hide. The rate of application is 9 g of solids per $m^2$ of leather. The finished leather has the following properties: high gloss; smooth pleasant handle.

Physical data:
Bally flexometer test (flexing endurance) according to IUP 20: specimens show no damage after 50,000 flexes at room temperature.
Dry and wet crock fastness according to IUF 450: no damage after 1,000 dry strokes or 300 wet strokes.
Adhesion according to IUF 470: approximately 400 g/cm.
Test of diffusion fastness of the coloration of leather in contact with plasticized polyvinyl chloride according to IUF 442: absolute dye diffusion fastness (grade 5 of the gray scale according to DIN 54,002).

EXAMPLE 2

125 parts of a copolyamide of 30% of the salt of adipic acid and hexamethylene diamine, 35% of caprolactam and 35% of the salt of adipic acid and bis-(4-aminocyclohexyl)-2,2-propane and having a K value of 40 are dissolved in a mixture of 160 parts of methanol, 500 parts of ethanol and 200 parts of toluene. 80 parts of this solution are stirred with 25 parts of a commercial nitrocellulose lacquer and are made up to twice their volume with a diluent mixture of equal parts by volume of ethyl glycol and cyclohexanol. This solution is applied by means of an intaglio printing roller to conventionally top coated corrected-grain side leather. The rate of application is 8 g of solids per m² of leather.

The finished leather has the following properties: high gloss, smooth pleasant handle.

Physical data:
Bally flexometer test according to IUP 20: no damage after 50,000 flexes at room temperature.
Dry and wet crock fastness according to IUF 450: no damage after 1,000 dry strokes or 300 wet strockes.
Adhesion according to IUF 470: approximately 1,000 g/cm.
Test of diffusion fastness of the coloration of leather in contact with plasticized polyvinyl chloride according to IUF 442: absolute dye diffusion fastness (grade 5 of the gray scale according to DIN 54,002).

EXAMPLE 3

100 parts of a copolyamide of 25% of the salt of adipic acid and hexamethylene diamine, 38% of caprolactam and 37% of the salt of adipic acid and bis-(4-aminocyclohexyl)-2,2-propane and having a K value of 63 are dissolved in a mixture of 140 parts of methanol, 350 parts of ethanol and 350 parts of toluene and the resulting mixture is diluted at a ratio of 1:0.5 by volume with a diluent mixture consisting of 17% of methanol, 27% of ethanol, 25% of toluene, 10% of ethyl glycol, 15% of methyl ethyl ketone and 6% of cyclohexanone. This solution is applied by means of an intaglio printing roller to a woven textile fabric coated with polyurethane. The rate of application is 7 g of dry substance per m². The finished material has the following properties: high gloss, pleasant leather-like handle.

Physical data:
Bally flexometer test according to IUP 20: no damage after 200,000 flexes.
Dry and wet crock fastness according to IUF 450: no damage after 1,000 dry stroles or 200 wet strokes.
Test diffusion fastness of the coloration in contact with plasticized polyvinyl chloride according to IUF 442: absolute dye diffusion fastness (grade 5 of the gray scale according to DIN 54,002).

COMPARATIVE EXAMPLE 1

(Using a copolyamide of the same quality but of different proportions)
Composition of copolyamide:
41% of salt of adipic acid and hexamethylene diamine
28% of caprolactam
31% of salt of adipic acid and bis-(4-aminocyclohexyl)-2,2-propane
K value 35.

150 parts of this copolyamide are dissolved in a mixture of 150 parts of methanol, 300 parts of toluene and 400 parts of ethanol. On cooling to room temperature, the solution gels after a short period. For this reason alone the said copolyamide could not be used industrially. 100 parts of the warm and clear solution are stirred with 20 parts of a commercial collodion finish and made up to three times the volume with a diluent mixture of 20% of methanol, 24% of ethanol, 22% of toluene, 15% of ethylglycol, 15% of methyl ethyl ketone and 4% of cyclohexanone. The resulting solution is sprayed onto conventionally top coated full grain nappa hide. The rate of application is 9 g of solids per m² of leather. The finished leather has the following properties: high gloss, smooth and pleasant handle.

Physical data:
Bally flexometer test according to IUP 20: after 5,000 flexes at room temperature the coating in the resulting folds in the specimens show grayness (due to fine cracks).
Dry and wet crock fastness according to IUF 450: no damage after 1,000 dry strokes but appreciable damage after 150 wet strokes.
Adhesion according to IUF 470: Approximately 150 g/cm.
Test of diffusion fastness of the coloration of the leather in contact with plasticized polyvinyl chloride according to IUF 442: good dye diffusion fastness (grade 4 of the gray scale according to DIN 54,002).

COMPARATIVE EXAMPLE 2

(Using a copolyamide differing in quality from that claimed) Composition of copolyamide:
40% of caprolactam
20% of salt of adipic acid and hexamethylenediamine
40% of salt of decanodioic acid and 4,9-dioxadodecane-1,10-diamine
K value is 42.

150 parts of this copolyamide are dissolved in a mixture of 150 parts of methanol, 350 parts of ethanol and 350 parts of toluene. 100 parts of this solution are diluted with half their volume of a diluent mixture of equal parts of ethylglycol and cyclohexanol. This solution is applied, by means of an intaglio printing roller, to conventionally bottom-coated, corrected-grain side leather. The rate of application is 8 g of copolyamide per m² of leather.

The finished leather has the following properties: high gloss, somewhat reduced slip.

Physical data:
Bally flexometer test according to IUP 20: after 15,000 flexes at room temperature there is grayness of the coating in the folds due to fine cracks.
Dry and wet crock fastness according to IUF 450: slight damage after 1,000 dry strokes and distinct damage after 100 wet strokes.
Adhesion according to IUF 470: approximately 350 g/cm.
Test of diffusion fastness of the coloration in contact with plasticized polyvinyl chloride according to IUF 442: no diffusion fastness (grade 1 of the gray scale according to DIN 54,002).

We claim:
1. In a process for finishing leather or leather substituents by applying a solution of a copolyamide in a mixture of conventional organic solvents and drying, the improvement which comprises applying a copolyamide having a K value of from 35 to 70 and the following composition:
   (a) from 10 to 32% by weight of adipic acid/hexamethylene diamine
   (b) from 30 to 45% by weight of caprolactam and
   (c) from 28 to 45% by weight of adipic acid/bis-(4-aminocyclohexyl)-2,2-propane.
2. A process as claimed in claim 1, which comprises finishing leather or a leather substitute which consists of polyurethane at least at the surface to which said solution is applied.

3. A process as claimed in claim 1, wherein the copolyamide applied has a K value of from 35 to 70 and the following composition:

(a) from 18 to 30% by weight of adipic acid/hexamethylene diamine
(b) from 35 to 42% by weight of caprolactam and
(c) from 35 to 42% by weight of adipic acid/bis-(4-aminocyclohexyl)-2,2-propane.

* * * * *